(12) United States Patent
Ogura et al.

(10) Patent No.: US 8,328,148 B2
(45) Date of Patent: Dec. 11, 2012

(54) STAND FOR A DISPLAY UNIT

(75) Inventors: Kenji Ogura, Osaka (JP); Yuki Kita, Osaka (JP); Akihiro Fujikawa, Osaka (JP); Hideo Yonezawa, Osaka (JP); Tsukasa Fujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 201 days.

(21) Appl. No.: 12/841,648

(22) Filed: Jul. 22, 2010

(65) Prior Publication Data

US 2011/0036957 A1 Feb. 17, 2011

(30) Foreign Application Priority Data

Jul. 23, 2009 (JP) ................................ 2009-171787

(51) Int. Cl.
*F16M 11/00* (2006.01)
(52) U.S. Cl. ................... 248/176.1; 248/188.9; 248/676
(58) Field of Classification Search ............... 248/176.1, 248/146, 151, 158, 188.9, 346.01, 346.04, 248/676
See application file for complete search history.

(56) References Cited

U.S. PATENT DOCUMENTS

| 6,936,919 | B2 * | 8/2005 | Chuang et al. | ................. | 257/717 |
| 2007/0164492 | A1 * | 7/2007 | Cook | ............................. | 267/141 |
| 2007/0263180 | A1 | 11/2007 | Tsuboi | | |
| 2009/0020664 | A1 * | 1/2009 | Ma | ................................. | 248/158 |
| 2010/0181442 | A1 * | 7/2010 | Nales | ............................. | 248/121 |

FOREIGN PATENT DOCUMENTS

| EP | 1 855 158 A2 | 11/2007 |
| JP | 2007-304171 | 11/2007 |
| JP | 2008-128355 | 6/2008 |

OTHER PUBLICATIONS

Communication from European Patent Office dated Sep. 24, 2012 in European counterpart application.

* cited by examiner

*Primary Examiner* — Ramon Ramirez
(74) *Attorney, Agent, or Firm* — Morgan, Lewis & Bockius LLP

(57) ABSTRACT

The present invention relates to a stand for supporting a thin display unit, such as a liquid crystal display, upright. In order to provide the stand for the display unit in which a quadrangular rubber pad is attached in a not-easily removable state with a simpler structure, rubber pad attachment portions are provided, each rubber pad attachment portion (2) including a quadrangular frame rib (21) to which each quadrangular rubber pad (4) is attached and being formed into a quadrilateral in a plan view, an abutment rib which regulates a fitting depth of the rubber pad and abuts with the rubber pad in a predetermined abutment area is provided in each rubber pad attachment portion, and evacuation spaces (5(5A to 5D)) allowing further fitting of the rubber pad are provided at positions corresponding to four corners of the rubber pad (4) where the abutment rib is not provided.

5 Claims, 3 Drawing Sheets

STAND FOR A DISPLAY UNIT

This application is based on Japanese Patent Application No. 2009-171787 filed on Jul. 23, 2009, the contents of which are hereby incorporated by reference.

BACKGROUND OF THE INVENTION

1. Field of the Invention

The present invention relates to a stand for supporting a thin display unit, such as a liquid crystal display, upright, particularly to a stand provided with rubber pads on a bottom surface.

2. Description of Related Art

Conventionally, there is a known thin display device in which a liquid crystal module provided with a liquid crystal panel and a drive device is sandwiched between a front cabinet and a rear cabinet so as to form a display unit, and a stand for supporting this display unit upright is attached.

This type of stand is provided with a base with a large bottom surface area in many cases. In some cases, rubber pads are provided at a plurality of positions at an outer peripheral portion of the bottom surface of this base, so as to exert a buffering function for the display device to be disposed thereon and a damage preventing function for preventing damage on the bottom surface. Such a base is generally formed by a molded resin material, and provided with a smooth and uniform outer surface and a back side portion in which a large number of ribs are provided in a grid. Circular ribs to which columnar rubber pads are attached are provided at a plurality of positions (such as four positions) in the grid rib portion.

When the base is formed into a rectangular shape, the rubber pads are provided at four corner portions thereof, so that the base can be stably installed. When the base is formed into a circular shape, the rubber pads may be provided at a plurality of positions more than four points of the outer peripheral portion. For example, Patent Document 1: JP-A-2007-304171 discloses a projector in which five boss holes are provided for a circular base and five rubber pads are attached.

Quadrangular rubber pads may be used instead of the circular rubber pads. There is an already-disclosed attachment structure of support pads in which cubic rubber pads each provided with a hole are fitted into concave portions each provided inside with a columnar protrusion that is fitted with the hole, and a rib (a tiny streak) is formed on an outer periphery of each columnar protrusion so that the once-attached rubber pad is not removed (for example, Patent Document 2: JP-A-2008-128355).

At the time of manufacturing the rubber pads, a rubber plate with the same thickness as the rubber pads is manufactured, and the rubber pads of a desired shape are punched out from the rubber plate. Therefore, when the circular rubber pads are punched out, corner portions become excesses and not-effectively utilized parts become wastes, so that manufacturing cost is increased. Thus, in order to reduce the manufacturing cost of the rubber pad, the quadrangular rubber pad capable of effectively utilizing materials without generating wastes are preferable.

However, even with the quadrangular rubber pad, in the attachment structure of the support pad described in Patent Document 2, there is a need for providing the columnar protrusion formed with the rib (the tiny streak) in the concave portion to which the rubber pad is attached. Thus, the configuration is complicated, so that manufacturing cost of the base is increased. There is also a need for providing, in the rubber pad, the hole to be fitted onto the columnar protrusion, so that there is a problem of increased cost.

Therefore, in order to reduce the manufacturing cost of the rubber pad, the quadrangular rubber pad is preferably used. In order to reduce manufacturing cost of the stand, there is a need for providing the quadrangular rubber pad attachable in a not-easily removable state with a simpler attachment structure.

SUMMARY OF THE INVENTION

In consideration of the above problems, an object of the present invention is to provide a stand for a display unit in which quadrangular rubber pads are attached in a not-easily removable state with a simpler structure.

In order to achieve the above object, a stand according to the present invention, includes: a support portion for supporting a display unit; and a base including a flat and smooth outer surface and a back surface having a grid rib with an opened lower surface, rubber pad attachment portions being provided at a plurality of predetermined positions of the back surface, each rubber pad attachment portion including a quadrangular frame rib to which a quadrangular rubber pad with a predetermined thickness is attached and being in a quadrangular shape in a plan view, wherein each rubber pad attachment portion is provided with an abutment rib regulating a fitting depth of the rubber pad and abutting with the rubber pad in a predetermined abutment area, and evacuation spaces formed at positions corresponding to four corners of the rubber pad where the abutment rib is not provided, the evacuation spaces allowing further fitting of the rubber pad, and an adhesive is interposed between the abutment rib and the rubber pad so as to adhere and fix the rubber pad.

According to this configuration, the fitting depth of the rubber pad is regulated by the abutment rib. Therefore, by setting protruding height from a bottom surface portion of the base to be a predetermined amount, it is possible to exert predetermined buffering and damage preventing functions. The evacuation spaces are provided at the four corners of the quadrangular rubber pad. Therefore, even when external force is applied onto the rubber pad, the rubber pad is deformable to be fitted to the inner side so that evacuation portions for the rubber pad are formed. Thus, outward turning of the corner portions is suppressed so as to produce the stand from which the rubber pad is not easily removed.

According to the present invention, the stand with the above configuration is characterized in that the base is formed into a quadrilateral in a plan view, and the rubber pads are arranged at four corner portions of the base. According to this configuration, the rubber pads are provided at the four corners of the quadrangular stand. Therefore, the stand firmly holds a display device to be disposed thereon and exerts a desired buffering function.

According to the present invention, the stand with the above configuration is characterized in that the abutment rib includes a circular abutment rib provided at a center part of the rubber pad attachment portion, and a plurality of radial abutment ribs for connecting the circular abutment rib and an inner wall of the rubber pad attachment portion. According to this configuration, since the circular abutment rib and a plurality of the radial abutment ribs are used as the abutment rib, the abutment rib obtains a predetermined abutment area and has a predetermined adhering strength. The evacuation spaces are easily provided at the positions corresponding to the four corners of the quadrangular rubber pad.

According to the present invention, the stand with the above configuration is characterized in that the abutment rib includes a grid abutment rib. According to this configuration, since the grid abutment rib is used as the abutment rib, the abutment rib obtains a predetermined abutment area and has a predetermined adhering strength. The evacuation spaces are easily provided at the positions corresponding to the four corners of the quadrangular rubber pad.

According to the present invention, the stand with the above configuration is characterized in that the abutment rib includes a wide cross shaped abutment rib. According to this configuration, since the wide cross shaped abutment rib is used as the abutment rib, the abutment rib obtains a large abutment area and has a large adhering strength. The evacuation spaces are easily provided at the positions corresponding to the four corners of the quadrangular rubber pad.

BRIEF DESCRIPTION OF THE DRAWINGS

FIG. 3A shows a first embodiment in which a circular abutment rib and a plurality of radial abutment ribs are provided; FIG. 3B shows a second embodiment in which one vertical grid rib, one lateral grid rib and the circular abutment rib are provided; FIG. 3C shows a third embodiment in which a plurality of grid ribs is provided; and FIG. 3D shows a fourth embodiment in which one vertical wide grid rib and one lateral wide grid rib are provided.

DETAILED DESCRIPTION OF PREFERRED EMBODIMENTS

Figure 1:
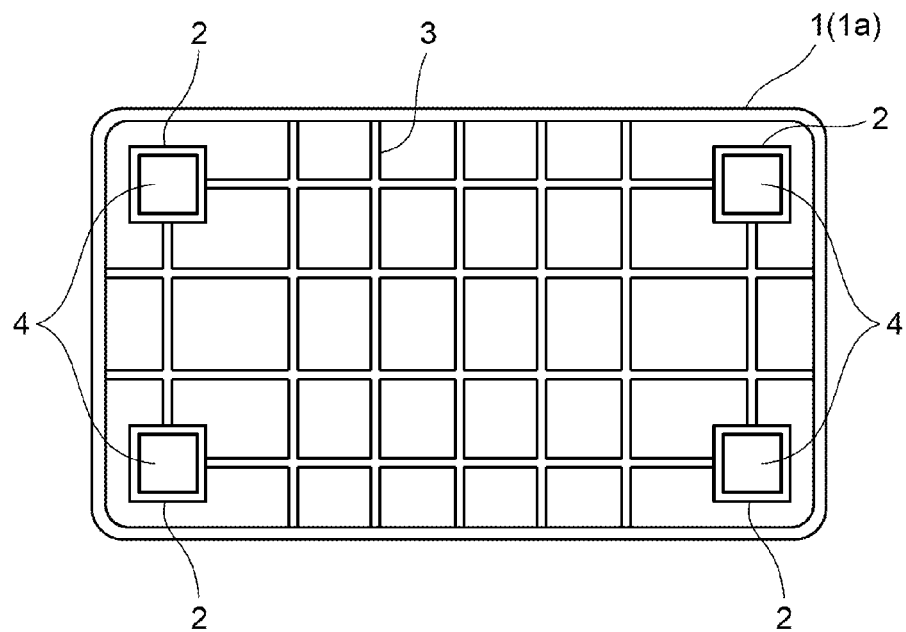
FIG. 1 is a bottom view of a stand according to the present invention.

Hereinafter, embodiments of the present invention will be described with reference to the drawings. The same reference numerals are used for the same constituent members and detailed description thereof will be appropriately omitted.

Figure 4:
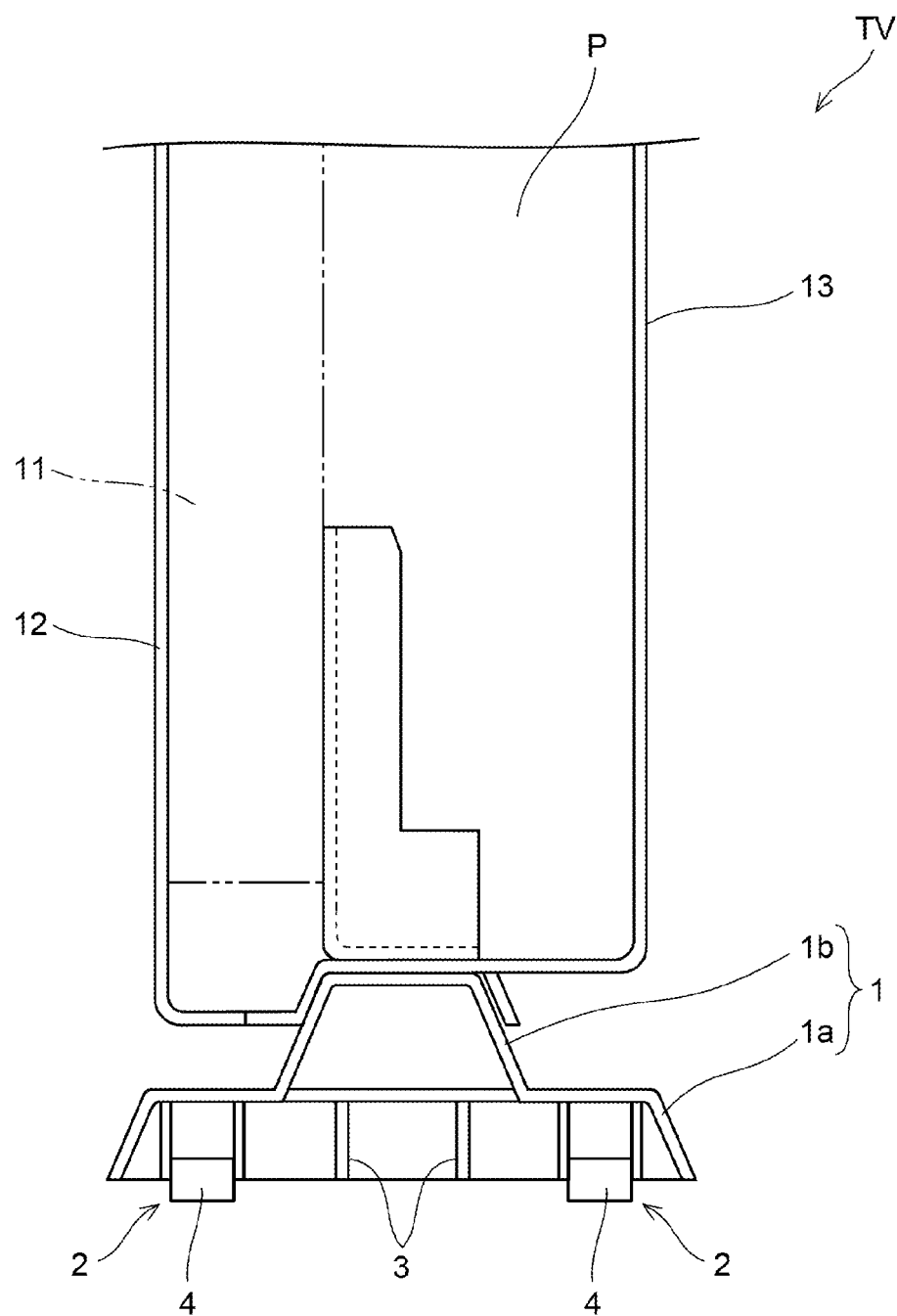
FIG. 4 is a schematic illustrative view of a display device provided with a stand according to the present invention.

A stand of the present embodiment is, for example, a stand 1 provided with a support portion 1b for supporting a display unit P provided with a liquid crystal module 11, a front cabinet 12 and a rear cabinet 13, and a base 1a, as shown in FIG. 4.

Rubber pads 4 are attached to the base 1a, so that the stand exerts a predetermined buffering function for preventing an impact on the display unit P. The stand also exerts a damage preventing function for preventing damage on a table surface when a display device TV in which this stand 1 is integrally attached to the display unit P is disposed on a table or the like.

The base 1a is provided with a flat and smooth outer surface and a back surface having grid ribs 3 with an opened lower surface. For example, as shown in FIG. 1, when the base 1a is formed into a quadrilateral in a plan view, the rubber pads 4 can be arranged at four corner portions. For example, when rubber pad attachment portions 2, each formed into a quadrilateral in a plan view, are provided at four corners of the quadrangular stand, and the quadrangular rubber pads 4 with a predetermined thickness are provided, the stand firmly holds the display device to be disposed thereon and exerts a desired buffering function. Abutment ribs which regulate a fitting depth of the rubber pad 4 and abut with the rubber pad in a predetermined abutment area are provided in each rubber pad attachment portion 2, and an adhesive is interposed between the abutment ribs and the rubber pad, so as to adhere and fix the rubber pad.

Figure 2:
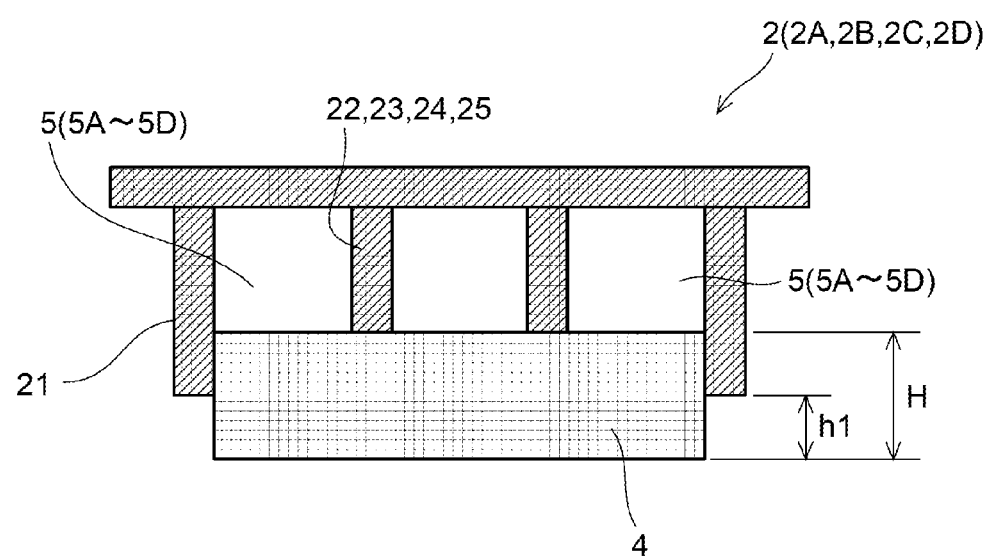
FIG. 2 is an enlarged sectional view of a rubber pad attachment portion.

For example, as shown in FIG. 2, the rubber pad attachment portion 2 (2A, 2B, 2C, 2D) is formed by a quadrangular frame rib 21 and provided with abutment ribs 22, 23, 24, 25 inside the frame rib. The fitting depth of the rubber pad 4 is regulated by the abutment ribs 22, 23, 24, 25 so that the rubber pad protrudes from an opening end of the frame rib 21 by height h1 when the rubber pad 4 with a thickness H is attached to this rubber pad attachment portion 2.

Evacuation spaces 5 (5A to 5D) allowing further fitting of the rubber pad 4 are provided at positions corresponding to the four corners of the rubber pad 4 where the abutment ribs 22, 23, 24, 25 are not provided.

With the above configuration, the fitting depth of the rubber pad 4 is regulated by the abutment ribs 22, 23, 24, 25. Therefore, by setting the protruding height h1 from a bottom surface portion of the base to be a predetermined height, it is possible to exert predetermined buffering and damage preventing functions. The evacuation spaces 5 (5A to 5D) are provided at the four corners of the quadrangular rubber pad 4. Therefore, even when external force is applied onto the rubber pad 4, corner portions of the rubber pad 4 are deformable to be fitted to the inner side so that outward turning of the corner portions is suppressed. Thus, in the stand 1, the rubber pad 4 is not easily removed.

Next, embodiments of the abutment ribs 22, 23, 24, 25 will be further described with using FIGS. 3A to 3D.

Figure 3A:
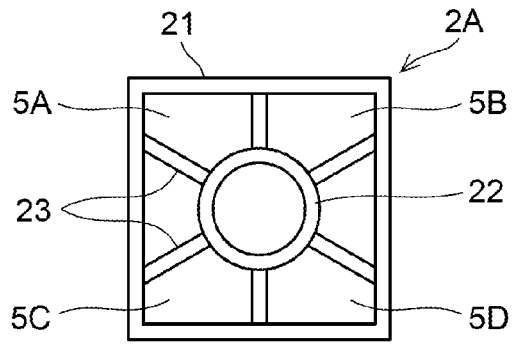
FIGS. 3A to 3D are plan views showing embodiments of the rubber pad attachment portion.

FIG. 3A shows the rubber pad attachment portion 2A of a first embodiment in which a circular abutment rib and a plurality of radial abutment ribs are provided as the abutment ribs. In this first embodiment, a circular abutment rib 22 is provided at a center part of the rubber pad attachment portion 2A, and a plurality of radial abutment ribs 23 (such as six radial abutment ribs shown in the figure) for connecting the circular abutment rib 22 with the frame rib 21 that forms a quadrangular outer frame is provided. Even with the configuration in which a plurality of the radial abutment ribs 23 is provided, the radial abutment ribs 23 are not provided at the four corners of the corner portions but the evacuation spaces 5A, 5B, 5C, 5D for the corner portions of the quadrangular rubber pad 4 are provided at the four corners of the corner portions.

With this configuration, since the abutment ribs including the circular abutment rib 22 and a plurality of the radial abutment ribs 23 are used, the abutment ribs obtain a predetermined abutment area. The evacuation spaces 5A to 5D are provided at the positions corresponding to the four corners of the quadrangular rubber pad 4. Therefore, even when the external force is applied, the corner portions of the rubber pad 4 are deformed to be fitted to the inner side so as to exert an effect that the rubber pad is not easily removed. That is, the evacuation spaces 5A to 5D serve as evacuation portions for the rubber pad 4.

Figure 3B:
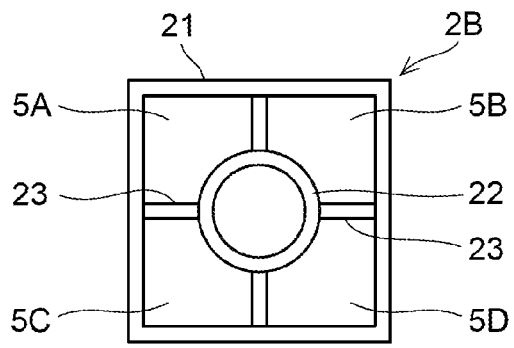

When the number of the radial abutment ribs 23 is increased, the abutment area with the rubber pad 4 is increased and adhesion strength is increased. However, when the number is excessively increased, an area of the evacuation spaces 5A to 5D is unfavorably reduced. Therefore, the installing number of the radial abutment ribs 23 is preferably minimized for satisfying a condition for satisfactory adhesion strength of the rubber pad 4. The six radial abutment ribs shown in this first embodiment or the rubber pad attachment portion 2B provided with the four radial abutment ribs 23 as in a second embodiment shown in FIG. 3B is preferable.

With this configuration, the circular abutment rib 22 and a total of four vertical and lateral radial abutment ribs 23 are provided. The abutment area to have a predetermined adhesion strength is obtained, and large evacuation spaces 5A to 5D can be provided at the positions corresponding to the four corners of the quadrangular rubber pad. Thus, it is possible to further easily form the evacuation portions for the rubber pad 4.

Figure 3C:
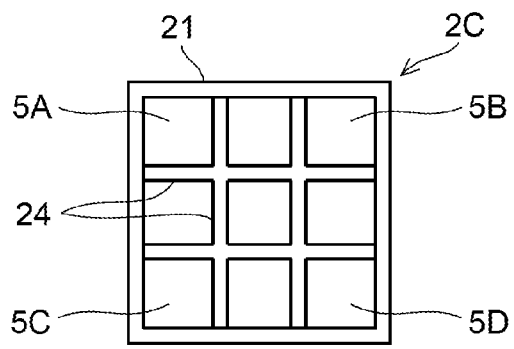

The grid abutment ribs 24 can be used as the abutment ribs. For example, as shown in FIG. 3C, the rubber pad attachment portion 2C of a third embodiment including the grid abutment ribs 24 in which two vertical ribs and two lateral ribs are provided inside the quadrangular frame rib 21 can be used. With this configuration, since the grid abutment ribs 24 are used as the abutment ribs, the abutment ribs obtain a predetermined abutment area and have a predetermined adhesion strength. The evacuation spaces 5A, 5B, 5C, 5D can be easily provided at the positions corresponding to the four corners of the quadrangular rubber pad 4.

Figure 3D:
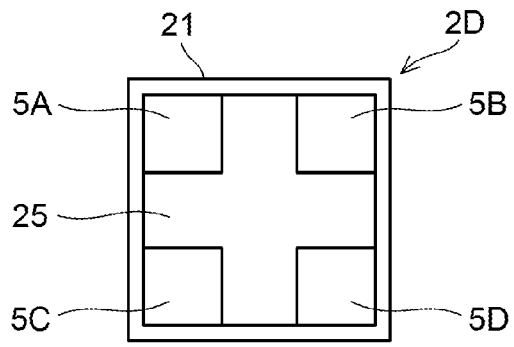

In a case where a wide abutment ribs can be provided in the rubber pad attachment portion 2, as shown in FIG. 3D, the rubber pad attachment portion 2D of a fourth embodiment including the wide cross shaped abutment ribs 25 in which one vertical rib and one lateral rib are provided inside the quadrangular frame rib 21 can be used. With this configuration, since the wide cross shaped abutment ribs 25 are used as the abutment ribs, the abutment ribs obtain a large abutment area and have a large adhesion strength. The evacuation spaces 5A. 5B, 5C, 5D can be easily provided at the positions corresponding to the four corners of the quadrangular rubber pad 4.

As described above, the rubber pads 4 are attached to the stand 1 provided with the support portion 1b for supporting the display unit P provided with the liquid crystal module 11, the front cabinet 12 and the rear cabinet 13, and the base 1a. And the rubber pad attachment portion 2A to 2D is provided with the evacuation portions for the rubber pad 4 formed at the positions corresponding to the corner portions of the rubber pad 4. Therefore, even when the external force is applied, the corner portions of the rubber pad 4 are deformed to be fitted to the inner side so that the outward turning of the corner portions is suppressed. Thus, in the stand 1, the rubber pad 4 is not easily removed.

When the base 1a is formed into a quadrilateral in a plan view, the rubber pad attachment portions 2 to which the rubber pads 4 are arranged are provided at the four corner portions of the stand. Thus, the stand 1 can firmly hold the display unit P to be disposed thereon by the rubber pads 4 that are provided at the four corners of the stand and exert a desired buffering effect.

Since a shape of the rubber pad 4 is not circular but quadrangular as described above, the predetermined number of the rubber pads 4 in predetermined size can be manufactured from a rubber plate with a predetermined thickness without generating excess wastes. Thus, it is possible to effectively utilize materials and reduce manufacturing cost of the rubber pad 4.

Even with the quadrangular rubber pad, the evacuation portions for the rubber pad are provided at the positions corresponding to the corner portions of the rubber pad in the rubber pad attachment portion formed by the quadrangular frame rib. Therefore, the corner portions are deformable to be fitted to the inner side of the rubber pad attachment portion so that the outward turning of the corner portions is suppressed. Thus, the rubber pad is not easily removed from the rubber pad attachment portion.

The stand for installing the display unit provided with the liquid crystal module or the like on the table is described above. However, the stand according to the present invention can be applied to a stand to be attached to an electric device other than the display unit or other cabinets.

As described above, according to the stand of the present invention, the quadrangular rubber pad attachment portions to which the quadrangular rubber pads are attached are provided, the abutment rib which regulates the fitting depth of the rubber pad and abuts with the rubber pad in a predetermined abutment area is provided in each rubber pad attachment portion, and the evacuation spaces allowing further fitting of the rubber pad are provided at the positions corresponding to the four corners of the rubber pad where the abutment rib is not provided. Therefore, even when the external force is applied onto the rubber pad, the rubber pad is deformable to be fitted to the inner side so that the evacuation portions for the rubber pad are formed. Thus, the outward turning of the corner portions is suppressed, and it is possible to obtain the stand from which the rubber pad is not easily removed.

Since the rubber pad is formed into a quadrilateral, it is possible to effectively utilize the materials and reduce the manufacturing cost of the rubber pad.

Therefore, the stand according to the present invention can be favorably applied to a stand for mass-produced home appliances and cabinets and the like.

REFERENCE SIGNS LIST

1 Stand
1a Base
2 Rubber pad attachment portion
3 Grid rib
4 Rubber pad
5 Evacuation space
21 Frame rib
22 Circular abutment rib
23 Radial abutment rib
24 Grid abutment rib
25 Cross shaped abutment rib

What is claimed is:

1. A stand for a display unit, comprising:
a support portion for supporting the display unit; and
a base including a flat and smooth outer surface and a back surface having a grid rib with an opened lower surface, rubber pad attachment portions being provided at a plurality of predetermined positions of the back surface, each rubber pad attachment portion including a quadrangular frame rib to which a quadrangular rubber pad with a predetermined thickness is attached and being in a quadrangular shape in a plan view, wherein
each rubber pad attachment portion is provided with an abutment rib regulating a fitting depth of the rubber pad and abutting with the rubber pad in a predetermined abutment area, and evacuation spaces formed at positions corresponding to four corners of the rubber pad where the abutment rib is not provided, divided by the abutment ribs, the four corner portions of the rubber pad to be deformable and allowing further fitting to the inner side, and
an adhesive is interposed between the abutment rib and the rubber pad so as to adhere and fix the rubber pad.

2. The stand for a display unit according to claim 1, wherein the base is formed into a quadrilateral in a plan view, and the rubber pads are arranged at four corner portions of the base.

3. The stand for a display unit according to claim 1, wherein the abutment rib includes a circular abutment rib provided at a center part of the rubber pad attachment portion, and a plurality of radial abutment ribs for connecting the circular abutment rib and an inner wall of the rubber pad attachment portion.

4. The stand for a display unit according to claim 1, wherein the abutment rib includes a grid abutment rib.

5. The stand for a display unit according to claim 1, wherein the abutment rib includes a wide cross shaped abutment rib.

* * * * *